United States Patent Office 3,798,245
Patented Mar. 19, 1974

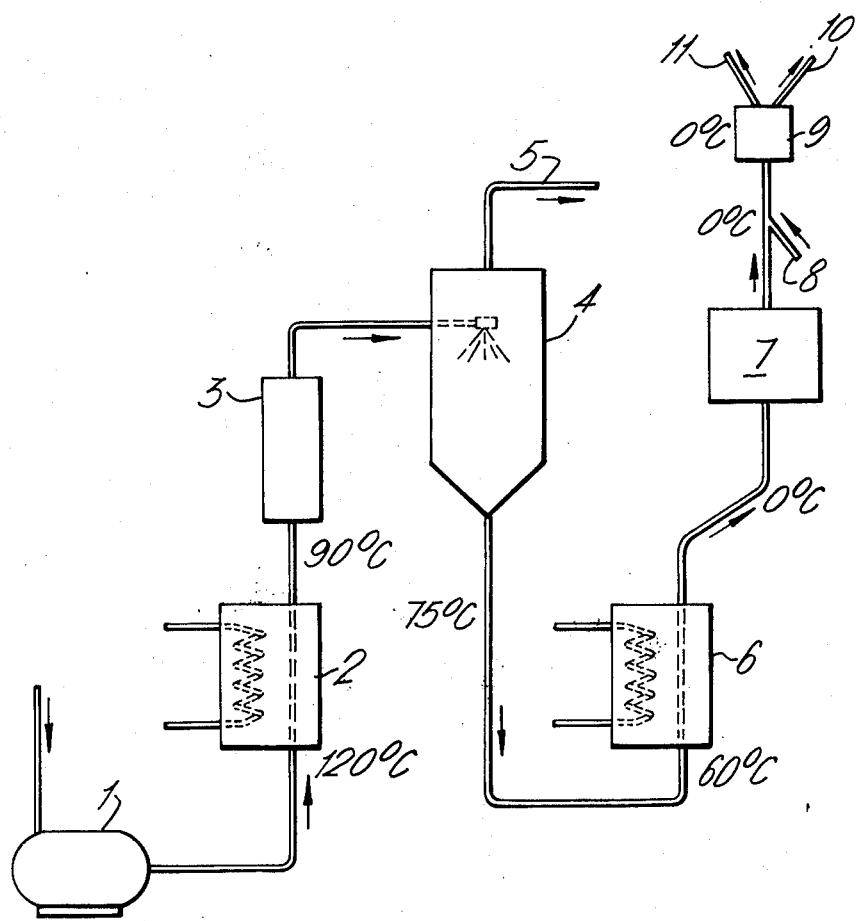

3,798,245
PROCESS FOR INTERESTERIFICATION OF A MIXTURE OF GLYCERIDES
Alex Maarten van Buren, Barendrecht, and Aloysius Bernardus Maria Cloosterman, Johannes Henricus Maria Rek, and Hendrik Frits Zock, Vlaardingen, Netherlands, assignors to Lever Brothers Company, New York, N.Y.
Filed Apr. 11, 1973, Ser. No. 350,261
Claims priority, application Great Britain, Apr. 13, 1972, 17,041/72
Int. Cl. C07c 53/00, 57/00, 59/00
U.S. Cl. 260—398       1 Claim

ABSTRACT OF THE DISCLOSURE

An improvement is described in the preparation of glyceride-fractions by directed interesterification followed by fractionation; after addition of alkali-metal to form the interesterification catalyst the mixture is degassed. By use of this improvement an excellent yield of a polyunsaturated fraction can be obtained from sunflower seed oil.

---

The invention relates to the directed interesterification of mixtures of glycerides by the addition of alkali-metal.

Interesterification of mixtures of glycerides using an interesterification-catalyst is a very well-known technique. Reference can be made, for instance, to U.S.A. patent specifications 2,442,531, 2,442,532, 2,442,533, 2,442,534, 2,442,539, 2,733,251, 2,751,304, 2,875,066, 2,875,067 and 2,886,578, U.K. patent specifications 924,818 and 1,236,233 and Placek and Holman, Ind. Eng. Chem., 1957, 49, pages 162 to 165. As explained more fully in the above references, interesterification-catalysts can be formed by the addition of alkali-metal to the mixture of glycerides, preferably dried and neutralized. Lithium, potassium, sodium or, in principle, caesium can be used or their mixtuers, particularly low-melting alloys of sodium and potassium.

A special form of interesterification to which the present invention is relevant is directed interesterification. As explained more fully in the above references, this involves the interesterification at such a temperature that higher-melting glycerides formed by interesterification start to crystallize. Interesterification normally tends to an equilibrium. Crystallization of higher-melting glycerides disturbs the equilibrium and continues till substantially the maximum amount of the higher-melting glycerides has been formed and has crystallized.

It has now been found that the crystallization during directed interesterification using addition of alkali-metal is improved if the glycerides are degassed after formation of the interesterification-catalyst and before substantial crystallization has taken place.

The invention therefore provides a process for the directed interesterification of a mixture of glycerides in which alkali-metal is added to form an interesterification-catalyst, characterized in that after formation of the interesterification-catalyst and before substantial crystallization has taken place the mixture of glycerides is degassed. Triglyceride oils are the most important glyceride-mixtures.

Possible explanations for the improvement that degassing as claimed gives in directed interesterification are that the minute gas-bubbles produced during formation of the interesterification-catalyst retard the rate of crystallization of the higher-melting triglycerides and cause excessive power-dissipation when, as is preferred, the mixture is stirred.

A further processing step that frequently follows directed interesterification is separation of the crystallized glycerides from the liquid glycerides, usually after decomposition of the interesterification-catalyst. By such a combined process from a complex, often commercially unacceptable mixture of glycerides a higher-metling crystalline fraction and a lower-melting, liquid fraction are obtained, both of which can be of commercial importance. In one convenient method the interesterification-catalyst is decomposed with an aqueous system into which the crystalline fraction is dispersed with the aid of surface-active agents inevitably present in or added to the system. The liquid glycerides can be separated from the aqueous solution containing the dispersed crystalline fraction, for example using a centrifuge. Examples of such processes are described in West German patent specification 1,418,884.

A further explanation when such a combined process is used for the improvement obtained by degassing after formation of the interesterification-catalyst and before at least full crystallization is that the gas, formed as mentioned above, might hinder wetting of the crystalline glycerides and hence their dispersion in the aqueous solution.

Whatever the truth about the above suggested explanations for the improved effects obtained by a process according to the invention, the overall effect is not simple. This is shown by the following: The process of the invention indeed gives some improvement with all glyceride mixtures but the improvement is not sufficiently large for the process to be attractive commercially except under severe economic pressure. However, with sunflower seed oil, very surprisingly, the process according to the invention gives a very large improvement, particularly when the crystalline fraction is dispersed in an aqueous solution and, as such a dispersion, is separated from the liquid fraction.

A special feature of the present invention is therefore a process for the directed interesterification of sunflower seed oil in which an alkali-metal is added to form an interesterification-catalyst characterized in that at least after formation of the interesterification-catalyst and before substantial crystallization has taken place the oil is degassed.

An aspect of this special feature is that it has been found that, when the crystalline fraction is to be separated in an aqueous dispersion, the interesterification-catalyst, contrary to the teaching of West German patent specification 1,418,884, can be decomposed and indeed preferably is decomposed using water containing negligible inorganic salts. Moreover a lower water:oil ratio than mentioned in 1,418,884 can be used; for example, for sunflower seed oil a ratio of 0.4 is preferred. Also the water added to decompose the catalyst need not contain any surface-active agent.

Aqueous fractionation involves the use of water usually containing inorganic salt and surface-active agent with a partly crystallized oil. A dispersion is formed of the crystals in the water and by separation of the oil and water layers the crystals can be separated from the oil. Various aspects of aqueous fractionation are described in for example, Henkel U.S. patent specification 2,800,493, German patent specification 977,544 and the specifications of German patent applications 1,256,645, 1,102,739 and 1,418,884. Reference can be made to these specifications for details of aqueous fractionation but the process is in principle extremely simple.

The alkali-metal can be added to the glyceride to form the interesterification-catalyst in any convenient manner as indicated in the U.S. patent specifications referred to above but a preferred technique is that disclosed and claimed in U.K. patent specification 1,236,233. The mixture of glycerides, usually of triglycerides, to which the alkali-metal is added will usually be at a temperature at which the alkali-metal is molten. For sodium, the preferred alkali-metal, the mixture of glycerides will preferably be at a temperature within the range 110° C. to 130° C. when the sodium is added. Because at 110° C. to 130° C. the catalyst will be too short-lived, the mixture should then preferably be cooled to between 60° C. and 100° C. The amount of alkali-metal should preferably be from 0.05 to 0.5%, particularly from 0.1 to 0.3%, of the mixture.

As stated, the degassing occurs at least after the interesterification-catalyst has been formed and before substantial crystallization has taken place. It has been found that, particularly for sunflower seed oil, after addition of the alkali-metal formation of the catalyst usually requires at least 0.5 minute and, for temperatures from 60° C. to 90° C., preferably at least 3 min. In general the time the mixture is at temperatures above the temperature at which interesterification occurs, should preferably be kept to a minimum. The maximum time at any temperature or combination of temperatures and the time required for a given oil at a given temperature for catalyst-formation can be readily determined by simple experiment. Unpractically long periods for catalyst-formation, at least for sunflower seed oil, are required if temperatures below 60° C. are used. Because of decomposition the temperature should preferably be below 150° C.

The degassing conveniently will be performed by subjecting the mixture to sub-atmospheric pressure, for instance by spraying the mixture into a vessel maintained under partial vacuum. With most glyceride-mixtures the degassing will preferably take place at a temperature above 20° C., particularly above 60° C., so that the mixture has a conveniently low viscosity, and below 90° C., so that not too much decomposition of the catalyst occurs.

After degassing, the mixture of glycerides is, if necessary, cooled to the temperature at which the required directed interesterification occurs. For sunflower seed oil this will be preferably below 10° C., particularly from 0° C. to 5° C.

In the figure is a schematic representation of a semicontinuous process according to the invention.

A mixture of glycerides containing molten alkali-metal is led to a homogenizer 1 and then cooled in a tube heat exchanger 2 before being led into a holding-vessel 3. The residence-time of the mixture between addition of the sodium and leaving the holding-vessel 3 was 4 minutes. The mixture was then sprayed into a vessel 4 maintained by means of pipe 5 under partial vacuum. From the vacuum-vessel the mixture was fed through a plate heat exchanger 6 to a vessel 7 in which the interesterification takes place in batch. After batch-crystallization in the interesterification-vessel 7 the mixture is then mixed with an aqueous system, through pipe 8, to decompose the catalyst and disperse the crystalline fraction in the aqueous system. The mixture with the aqueous system is then separated in centrifuge 9 into a liquid glyceride-fraction 10 and the aqueous system containing the crystalline glyceride-fraction 11.

The temperatures indicated in the figure are examples of those found to be suitable for sunflower seed oil using 0.15% sodium as the alkali-metal to form the interesterification-catalyst. The temperatures 75° C. and 60° C. are not significant.

In the light of this specification and the publications referred to it will be possible to find by simple experiment suitable conditions for other glyceride-mixtures.

Unless stated otherwise all figures and ratios mentioned in this specification are by weight.

EXAMPLE 1 AND COMPARISON A

Palm oil was interesterified for 20 hours at 35° C. using 0.15% of sodium. In Example 1 the oil was degassed immediately after formation of the catalyst; in Comparison A no degassing took place. In both cases, the product was treated with 50% of water to decompose the catalyst and then fractionated using a centrifuge after dispersion of the crystalline fraction in the aqueous system. Example 1 gave a 53% yield of olein; Comparison A gave a 49% yield.

EXAMPLE 2 AND COMPARISON B

Safflower oil was interesterified using 0.15% sodium at 0° C. for four days. The catalyst was decomposed using 50%, by weight of the oil, of a 5% $Na_2SO_4$ solution. Example 2, in which degassing immediately after formation of the catalyst had taken place, gave a 64% yield of olein; Comparison B, in which no degassing had taken place, gave a 57% yield.

EXAMPLE 3 AND COMPARISON C

Sunflower seed oil was interesterified using 0.15% sodium and as indicated in the figure. The ratio of water, used to decompose the catalyst, to oil was 0.4. A 70% yield of olein (Example 3) was obtained when degassing had taken place. When degassing, i.e. vessel 4, was omitted a 0% yield of olein was obtained (Comparison C).

What is claimed is:

1. A process for preparing a polyunsaturated-enriched olein from sunflower seed oil by the addition of from about 0.05 to about 0.5% of an alkali-metal to form an interesterification-catalyst, degassing of the mixture after formation of the interesterification-catalyst, crystallization below 10° C. of a stearin-fraction, addition of water to decompose the catalyst and to disperse the stearin in the water and separation of the remaining, polyunsaturated-enriched olein-fraction from the water containing the stearin-fraction.

References Cited

UNITED STATES PATENTS 3,170,799   2/1965   Feuge et al. _____ 260—398

ELBERT L. ROBERTS, Primary Examiner